United States Patent

Ikawa et al.

[11] Patent Number: 6,042,097
[45] Date of Patent: Mar. 28, 2000

[54] APPARATUS FOR POSITIONING WORKING TABLE

[75] Inventors: Kikuo Ikawa, Gifu-ken; Yukio Yoshioka, Tokyo, both of Japan

[73] Assignee: Nippon Thompson Co., Ltd., Tokyo, Japan

[21] Appl. No.: 09/132,141

[22] Filed: Aug. 10, 1998

[30] Foreign Application Priority Data

Aug. 11, 1997 [JP] Japan .................................. 9-227015

[51] Int. Cl.⁷ .................................................. B23Q 1/25
[52] U.S. Cl. ........................... 269/71; 269/73; 269/285; 254/104
[58] Field of Search ................................ 269/71, 73, 58, 269/60, 285, 234; 254/104; 108/20, 106; 248/657, 669, 660

[56] References Cited

U.S. PATENT DOCUMENTS

| | | | |
|---|---|---|---|
| 3,774,352 | 11/1973 | Weber | 254/104 |
| 5,427,349 | 6/1995 | Obrecht | 254/104 |
| 5,722,639 | 3/1998 | Nonaka | 254/104 |

FOREIGN PATENT DOCUMENTS

| | | |
|---|---|---|
| 4-002406 | 1/1992 | Japan . |
| 6-053042 | 7/1994 | Japan . |

*Primary Examiner*—Robert C. Watson
*Attorney, Agent, or Firm*—Browdy and Neimark

[57] ABSTRACT

An apparatus for precisely, speedy positioning a table on which a work piece is mounted. The apparatus has a moving mechanism in which a linear motion rolling guide unit is employed to convert the horizontal movement of a moving body by a linear motor to the vertical movement. Upon the moving body being horizontally moved with respect to the bed along first track rails through first sliding elements by mean of the linear motor, the working table moves vertically by the action of a second sliding element which moves along a second track rail on an inclined plane of the moving body. The vertical movement of the working table is controlled through third sliding elements so as to be guided along third track rails secured to a cylindrical member on the bed. The working table may make the vertical movement relative to the bed with high accuracy and high speed, irrespectively of loads variable in acting direction and magnitude.

9 Claims, 3 Drawing Sheets

APPARATUS FOR POSITIONING WORKING TABLE

BACKGROUND OF THE INVENTION

1. Field of the Invention

The present invention relates to an apparatus for positioning a working table on which a work piece is mounted for machining, assemblage, testing and the like in, especially, machine tools, assembly plants, test equipment, semiconductor fabricating apparatus and the like.

2. Description of the Prior Art

An apparatus for positioning a working table on which a work piece is mounted is well known as means that is primary and general applicable for promoting the recently remarkable development in mechatronics technology. Apparatus of this kind has been conventionally used in a working table in a machine tool to vertically move to a predetermined position a work piece that is mounted on the working table to be machined.

In recent years, the use of such apparatus extends into many technical fields, for instance, transfer apparatus, industrial robots, measuring instruments, semiconductor manufacturing apparatus having assembling units, testing instruments and exposure units, and the like. It is further well known that such apparatus may be mounted on a X-Y positioning table to be thereby used as a three-dimensional X-Y-Z positioning table. Shown in Japanese Utility Model Application Laid-Open No. (Hei) 6-53042 is a positioning table that may be moved vertically in virtue of an inclined plane. The table unit comprises a base, a first table having an inclined plane on its top face and being movable in the horizontal direction, a first driving mechanism being of a threaded shaft which is provided on the base to travel the first table, a second table being movable along the inclined plane, and a second driving mechanism being of a threaded shaft which is provided on the first table to travel the second table.

In the positioning table unit cited in the above, the threaded shafts are each provided for each of the tables to bear the loads so that two sets of driving mechanisms are required whereby the table unit adversely becomes too big in height. The prior positioning table has drawbacks in which it is in particular difficult to secure the required rigidity and in which the tables are unstable in positioning and operation. Accordingly, the positioning table unit is unsuited for the working table in the machine tool, in which the precision positioning is inevitable.

Japanese Patent Application Laid-Open No. (Hei) 4-2406 discloses a positioning table unit having a lifting table secured to the top of a threaded ball screw shaft which is arranged in vertical direction. The threaded ball screw shaft has therein a center hole in which a spline shaft fixed to a stationary bed is fitted in such a manner that it is movable in axial direction but restrained in rotational direction. The thread ball screw shaft is screwed on a nut that is directly connected with a rotating member of a driving source provided on the stationary bed so that the lifting table may be moved vertically.

Proposed in the above Laid-Open No. (Hei) 4-2406 are alternative embodiments of a bar system and a pantograph system in which the horizontally operated variable may be converted into the vertical displacement.

The lifting table disclosed in the above Laid-Open No. (Hei) 4-2406 has the threaded ball screw shaft arranged in vertical direction, whereby the table unit adversely becomes too big in height. The big load is substantially born by rolling elements engaged with the treaded ball screw shaft so that the threaded ball screw shaft should be made large in diameter, resulting in the large scale of the positioning table unit. Thus, the prior art is also unsuited for the working table which is to be moved vertically under the situation where the work piece is supported thereon.

SUMMARY OF THE INVENTION

An object of the present invention is to overcome the shortcomings as described above with reference to the prior art, and to provide an apparatus for positioning a working table in which the horizontal movement of a moving unit is converted to the vertical movement of the working table in virtue of an inclined plane, the improvement having track rails and sliding elements movable along the track rails to thereby travel the moving unit with respect to the bed and the working table and also to vertically move the working table. This arrangement may improve the positioning of the working table with respect to the bed with vertical precision and moreover make the table unit itself compact in size.

The present invention provides an apparatus for positioning a working table, comprising a bed, first track rails mounted on the bed, a moving unit provided no the bottom surface thereof with first sliding elements movable along the first track rails, the moving unit being provided on the top surface thereof with an inclined plane, a second track rail mounted on the inclined plane with inclination along the sliding direction of the moving unit, a working table provided on the bottom surface thereof with a second sliding element movable along the second track rail, a supporting member mounted on the bed and extending vertically, third track rails fixed to the supporting member in direction extending vertically, third sliding elements provided to the working table so as to be movable along the third track rails, and driving means to travel the moving unit along the first track rails.

As the positioning table according to the present invention is provided as described above, the driving means travels the moving unit through the first sliding elements with respect to the bed along the first track rails to thereby cause the second track rail on the inclined plane of the moving unit for horizontal movement. With the movement of the moving unit, the working table moves vertically through the third sliding elements with respect to the third track rails that are secured on the supporting member.

As a result, it will be understood that the working table is movable through the second sliding element along the second track rail, but does not allowed to move with respect to the bed other than in the vertical direction. The relative movements among the moving unit, bed, working table and supporting member are completely under the control of the coupling of the track rails with the sliding elements. The positioning of the working table may be controlled with high precision and the apparatus may be made compact as a whole in size.

The supporting member may be preferably made of a cylindrical member which is mounted on the bed so as to surround the apparatus. The cylindrical member may be formed of any one of circle and polygon in its cross section. Where the supporting member of right circular cylinder is subjected to the horizontal component of force acting on the inclined plane, the positioning of the working table may be efficiently achieved with both high-speed and high-precision and the apparatus may be made compact in size with more rigidity.

The third track rails are secured on the inner surface of the cylindrical member in an angularly separated relation with each other and the third sliding elements are arranged on the moving unit in opposition to the third track rails. This arrangement results in that the working table may be moved vertically with stability and controlled in positioning operation with high precision. It is preferred that the supporting member is made of the cylinder and the couplings of the third sliding elements and track rails are arranged in such a relationship that they are angularly separated each other with 120 degrees around the axis of the working table, with taking consideration dynamic balance of the movement of the working table as well as compactness in size.

It will be seen that there is a force perpendicular to the inclined plane, which force acts between the second track rail extending in the sliding direction and the second sliding element movable along the second track rail. The force is divided into a horizontal component and a vertical component for vertically moving the working table. It is preferred that the third track rails are provided at three locations in an equally spaced relation with each other and any one of the third track rails is arranged on an extension line of the inclined plane on the moving unit. According to this design, the third track rail on the extension of the inclined plane may oppose squarely to the horizontal component force and the other track rails may be arranged in symmetry with each other around the inclined plane whereby the positioning of the working table may be controlled with high precision.

The apparatus according to the present invention requires only one driving means to travel the moving unit. The driving means is preferably made of a linear motor which may be of any one type of a multiple-pole synchronous type linear motor in which magnets are directly opposed to gaps between stators and armatures, inductor type linear motor in which inductor teeth are opposed to the gaps, and induction linear motor. The linear motor comprises armatures fixed to the bottom surface of the moving unit and provided with exciting coils, and stators fixed on the bed and provided with arranged in opposition to the armatures. The driving means of linear motor may get high speed and high precision, in comparison with the indirect driving of, for example, feed screw. It will be noted that the linear motor may contribute to reduction of parts and cost, and compactness in size of the apparatus, in comparison with the conventional indirect driving means.

The track rails are each provided at lengthwise surfaces thereof with first raceway grooves. The sliding elements each comprise a casing provided with second raceway grooves which are in opposition to the first raceway grooves, rolling elements received rotatably in spaces defined by the opposed raceway grooves, end caps each attached to one of lengthwise ends of the casing, and end seals covering the end caps.

The track rails and sliding elements, in combination, constitute a linear motion rolling guide unit in which the relative sliding movement between the track rails and the sliding elements is smooth with low frictional resistance whereby the positioning of working tables may be controlled with high accuracy.

The bed may be mounted on any one of the stationary and X-Y coordinate platforms. Upon the bed being mounted on the X-Y coordinate platform, the working table may be controlled with precious positioning in three-dimensional X-Y-X directions.

The apparatus according to the present invention has, as described above, such features that the horizontal movement of the moving unit is converted to the vertical movement of the working table in virtue of an inclined plane and that there is used the linear motion guide unit comprising the track rails and the sliding elements movable along the track rails, so that the cooperation of the track rails with the sliding elements may flexibly comply with loads variable in magnitude and direction to thereby achieve smooth sliding motion.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
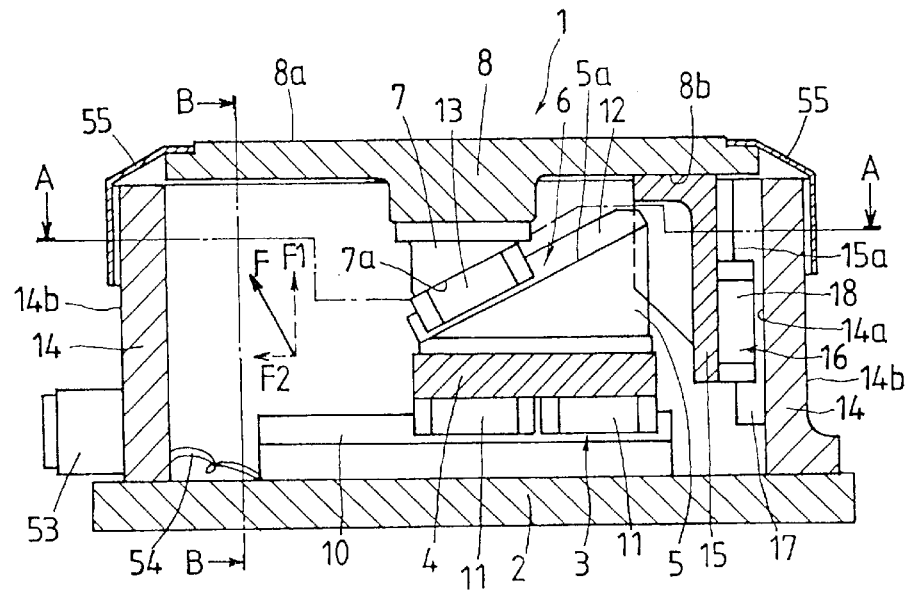
FIG. 1 is a cross-sectional view showing a preferred embodiment of an apparatus for positioning a table, according to the present invention, and is taken along the line C—C of FIG. 3.

Referring now in detail to the drawings, the apparatus for positioning a working table according to the present invention will be explained below.

The apparatus of the present invention is of a disc-like configuration that is preferable for mechanical balance. The apparatus is provided with a bed 2 to be mounted on a stationary platform or a X-Y platform by fixtures, not shown in figures.

The apparatus 1 primarily comprises the bed 2, first track rails 10 mounted on the bed 2, a horizontal table 4 of rectangle movable along the track rails 10, a base 5 having a inclined plane 5a on the top thereof, the base 5 being integrally mounted on the horizontal table 4 by bolts or the like, a second track rail 12 provided on the inclined plane 5a, a working table 8 movable along the second track rail 12, and a cylindrical supporting member 14 to which third track rails 17 are provided for guiding vertically the working table 8.

Figure 2:
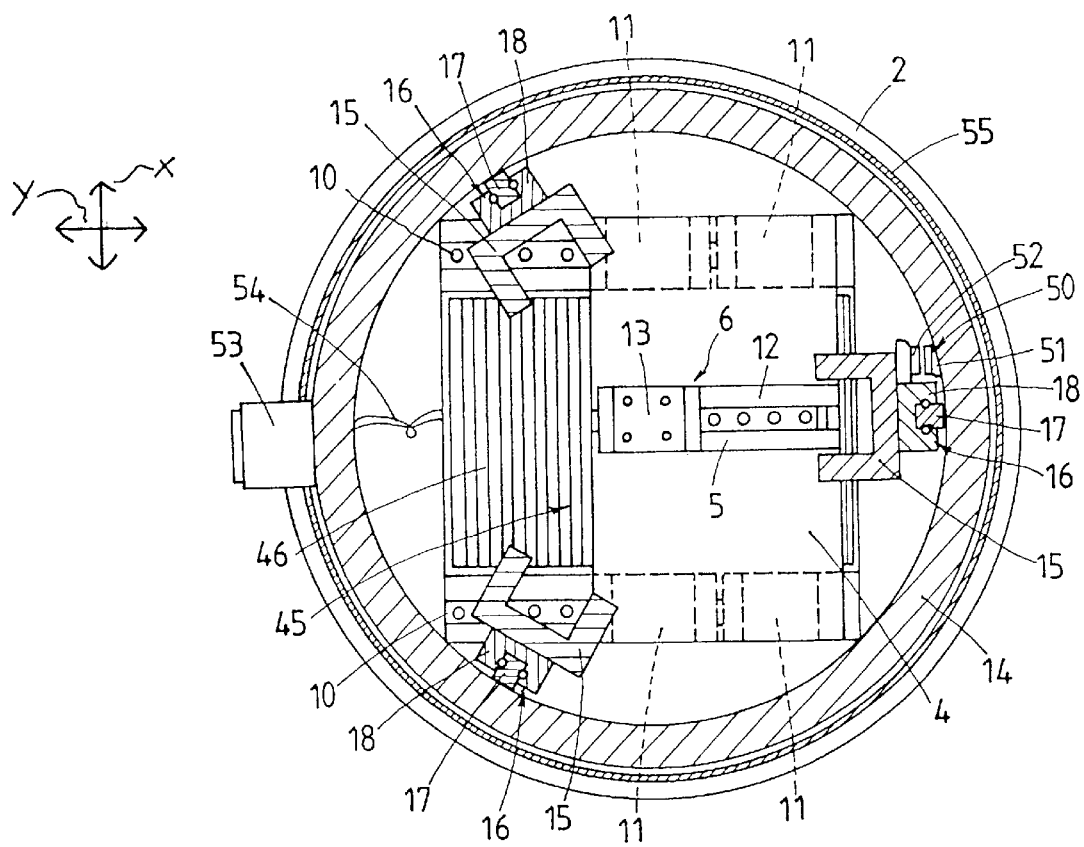
FIG. 2 is a schematic traverse sectional view of the apparatus and is taken along the line A—A of FIG. 1.

The X-Y coordinate platform, indicated schematically in FIG. 2 by arrows X and Y, has track rails of X-direction fixed to a basement, a X-table movable along the track rails of X-direction through sliders of X-direction, track rails of Y-direction fixed to the X-table, a Y-table movable along the track rails of Y-direction through sliders of Y-direction, and means for driving the X-table and Y-table. The apparatus 1 may be combined with the X-Y platform by mounting of the bed 2 onto the Y-table of the X-Y platform to thereby provide three-dimensional X-Y-Z positioning means.

Mounted on a horizontal plane 2a of the bed 2 is a pair of first track rails 10 by bolts or the like, the track rails being in parallel with and spaced from each other. The horizontal table 4 is provided on the bottom surface 4b thereof with first sliding elements 11 by bolts or the like. The first sliding elements 4b are arranged in opposition to the track rails 10 and movable in such a manner as to saddle over the track rails 10. The first track rails 10 and sliding elements 11, in combination, constitute horizontal guide units 3 to guide the horizontal table 4 with respect to the bed 2 in horizontal moving direction. The sliding elements 11 on each of the track rails 10 are arranged in series along the direction of the track rails 10. The horizontal table 4 has a top face 4a on which an inclined base 5 is mounted at the substantially central location of the top face 4a by bolts or the like. The inclined base 5 is provided with an inclined plane 5a of inclination along the moving direction of the horizontal table 4.

Mounted on the inclined plane 5a of the inclined base 5 is a second track rail 12 by bolts or the like, the second track rail 12 extending along direction of inclination. The working table 8 has an inclined bracket 7 which is integrally secured to the table 8 by bolts or the like. The inclined bracket 7 is provided with an inclined bottom plane 7a on which a second sliding element 13 is fixed by bolts or the like. The sliding element 13 saddles over the second track rail 12 so as to be movable along the track rail 12. The second track rails 12 and sliding elements 13, in combination, constitute an inclined guide unit 3 to guide the working table 8 with respect to the horizontal table 4. The inclined bracket 7 is provided at the substantially central location of the working table 8 by bolts or the like. It will be understood that the inclined plane 5a and inclined bottom plane 7a are identical with each other in the inclination with respect to the horizontal.

The apparatus 1, further, has cylindrical member 14 which is secured at its bottom edge to the bed 2. In the embodiment shown here, the cylindrical member 1a of right circular cylinder is elected from the view of compactness and mechanical balance. The cylindrical member 14 has an inner circular surface 14a of the inside diameter substantially identical with the outside diameter of the working table 8. Third track rails 17 are vertically secured to the inner surface 14a of the cylindrical member 14 which is secured to the bed 2 along the periphery thereof. Brackets 15 are secured to the bottom surface 8b of the working table 8. The brackets 15 are provided at the diametrical outside thereof with third sliding elements 18 movable along the third track rails 17. The track rails 17 and sliding elements 18, in combination, constitute a vertical guide units 16 to vertically guide and keep the working table 8 in alignment with the center thereof.

The track rails 17 of the vertical guide unit 16 are angularly spaced from each other and secured to the inner circular surface 14a of the cylindrical supporting member 14. In the embodiment shown here, there are provided three track rails 17 secured to the inner surface 14a of the cylindrical member 14 at three locations where they are spaced from each other with an equal angle around the center of the table 8. It is in particular noted that any one of three locations is arranged on an extension line of the inclined plane 5a of the inclined base 5 and other two locations are spaced from each other with three equal arcs of the inner surface 14a of the cylindrical member 14 and arranged in symmetry with each other with respect to the extension line of the inclined plane 5a. Since the track rails 17 are, as described above, arranged with respect to the inclined plane 5a of the inclined base 5, the horizontal component F2 of the force acting on the inclined plane 5a may be squarely received by the track rail 17 on the extension line of the inclined plane 5a, that is, at the back of the inclined plane 5a. As a result, other track rails 17 may be arranged in symmetry whereby the working table is controlled with high accuracy The brackets 15 are made of material that is light in weight, but superior in rigidity. As shown in FIG. 2, the brackets 15 are of U-shape in cross section and the inclined bases 5 are sandwiched between webs of the brackets 15. In the apparatus 1 described in detail above, with the horizontal movement of the horizontal table 4 including the inclined base 5, the working table 8 is vertically moved in alignment with the center of the apparatus 1 under the guidance of the vertical guide unit 16.

It will be understood that the cylindrical member 14 functions as a casing to surround the whole mechanism therein and provides the protection against contamination of dust as well as splash of lubricating oil. A covering sheet 55 is for the protection against contamination of dust. The covering sheet 55 is attached to the upper surface 8a of the working table 8 and hangs down from the peripheral edge of the table 8 so as to cover up the circumferential opening between the working table 8 and the cylindrical member 14.

Figure 5:
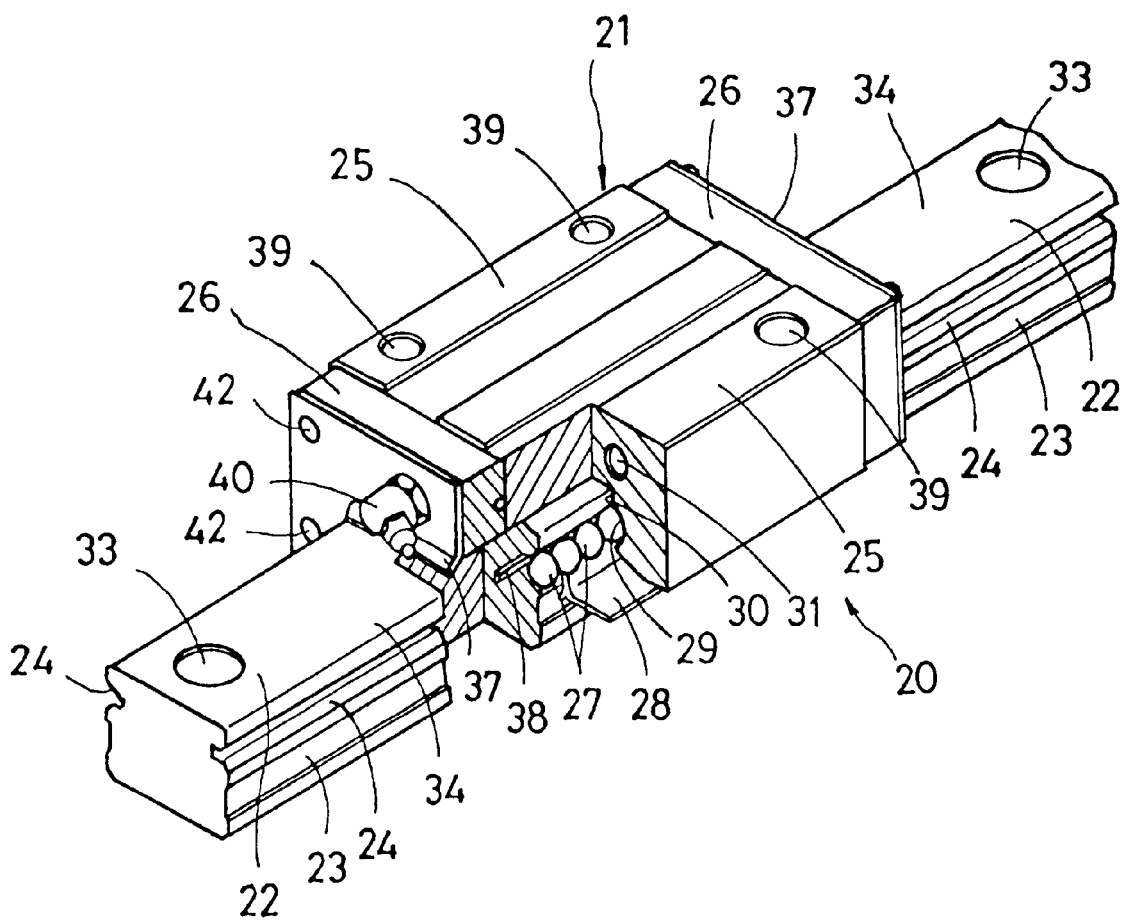
FIG. 5 is a perspective view showing a linear motion guide unit in which the apparatus of the present invention may be applicable.

A linear motion rolling guide unit 20 shown in FIG. 5 may be applicable to the horizontal, inclined and vertical guide units 3, 6 and 16, each of which is composed of the combination of the track rails 10, 11 and 12 with the sliding elements 13, 17 and 18.

It is noted that the linear motion rolling guide unit 20 has the feature that the cooperation of the track rails with the sliding elements may flexibly comply with loads variable in magnitude and direction to thereby achieve smooth sliding motion. The linear motion rolling guide unit 20 comprises a track rail 22 provided on its longitudinally-extending side surfaces 23, 23 with first raceway grooves 24, and a sliding element 21 having second raceway grooves 29 opposed to the first raceway grooves 24 on the track rail 22. The sliding element 21 saddles on the track rail 22 for linear sliding movement. Rolling elements 27 are confined for free rotation in a ball raceways defined by the opposed raceway grooves 24, 29. With the movement of the sliding element 21 relative to the track rail 22, the rolling elements 27 may move along the raceways in the sliding element under load in a circulating manner.

Referring to FIG. 5 showing the linear motion rolling guide unit 20, the track rail 20 has openings for fixture bolts on its upper surface 34. The sliding element 21 has a casing 25 movable relatively to the track rail 22 and end caps 36 attached to any the opposed end faces of the casing 25. The casing 25 is provided therein with return passage for the circulating movement of the rolling elements and is provided on its upper surface with openings 39 for mounting to a horizontal table 4, inclined bracket 7 or bracket 15. The casing 25 and end caps 26 are provided on bottom surfaces thereof with recesses 30 by which the casing and end caps may saddle on track rail 22 for free linear movement. The recesses 30 are further provided with raceway grooves 29 in correspondence with the raceway grooves 24 on the track rail 22.

The raceways defined by the raceway grooves 24, 29 confine therein rolling elements such as balls, rollers or the like for freely circulating movement. In order to prevent the rolling elements 27 from falling out of the casing 25, retainer bands 38 are fitted in the casing 25 so as to surrounding the rolling elements 27. The sliding element 21 has on its lower surface bottom seals 28 to secure the sealing between the track rail 22 and sliding element 21. The guide unit 20 may be applicable by fixing the track rail 22 to the bed 2, inclined base 5 or cylindrical member 14 through bolts (not be shown) which are screwed in the openings 33 of the track rail 22.

The end caps 26 are provided with claws for scooping up the rolling elements 27 from the raceway grooves 24 forming the lorded track regions with the track rail 22. The end caps have direction-changing passages for circulating movement of the rolling elements 37. Mounted on the end caps 26 are end seals 37 for keeping sealing function between the track rail 22 and the longitudinally opposed ends of sliding element 21. Grease nipples 40 are provided on the end caps 26 for feeding lubricating oil to the raceways defined by the raceway grooves 22, 29 of the track rail 22 and sliding element 21. The end caps 26 are secured to the opposing ends of the casing 25 by means of screws 42 or the like. The rolling elements 27 move along the loaded regions, that is, the raceway grooves 24 of the track rail 22 and then come in the direction changing passages in the end caps 26. The rolling elements 27 further move to the return passages 31 which are formed in the casing 25 in parallel with the raceway grooves 29. It will be thus understood that the rolling elements 27 may circulate though the raceways, direction changing passages and return passages 31. As a result, the sliding element 21 may move smoothly and relatively to the track rail 22 by the action of the movement of the rolling elements 27.

Figure 3:
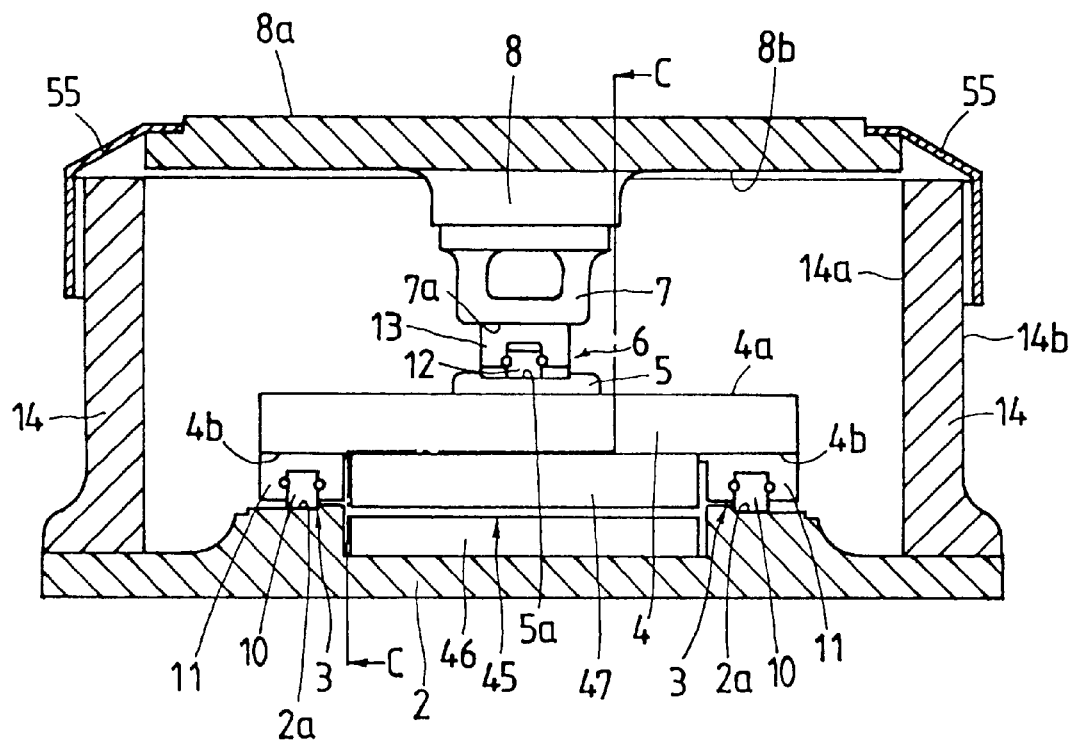
FIG. 3 is a longitudinal sectional view of the apparatus and is taken along the line B—B of FIG. 1.
Figure 4:
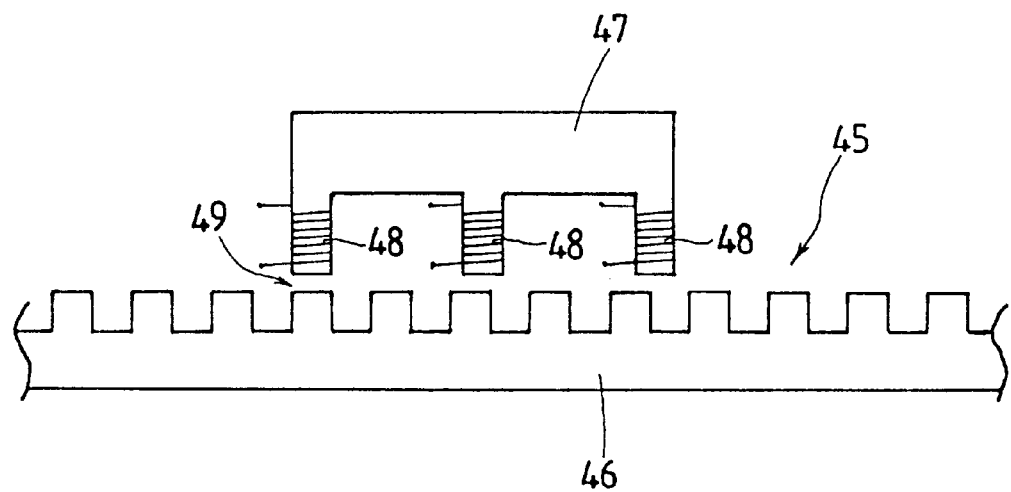
FIG. 4 is a schematic illustration showing a linear motor incorporated in the apparatus of the present invention.

Driving means of a linear motor 45 is applied for the movement of the sliding element 21 with relative to the track rail 22. It is preferred to use an electromagnetic type linear motor capable of highly propulsive output. Referring to FIG. 3, the linear motor of electromagnetic type is composed of an elongated stator 46 acting as an inductor, the stator being secured on the bed 2 along the direction of movement of the horizontal table 4, and an armature 47 secured to the lower surface 4b of the horizontal table 4 in opposition to the stator 46 with a gap between them. The armature 45 has an exciting coil 48 energized by the external electric source. As shown in FIG. 4, the linear motor 45 is of electromagnetic type in which inductor teeth are arranged in opposition to the gap 49. Where the linear motor is of high-density system having two sheets of the teeth which are composed of inductor teeth in the gap 49 and permanent magnets inserted into the teeth of the armature 47, the iron core efficiency is improved with higher propulsion.

For controlling the vertical positioning of the working table with high accuracy, there is provided a linear encoder 50 which may detect the vertical position of the working table 8. The linear encoder 50 comprises a linear scale 51 and a sensor 52. The linear scale 51 extends vertically along Z-coordinate and is secured to the inner surface 14a of the cylindrical member 14. The sensor 52 is mounted to the bracket 15 in opposing to the scale 51.

Mounted on the outer peripheral surface 14b of the cylindrical member 14 is a connector 53 which is connected with the electric source, controller and the like. Both of detected signals and control signals between the connector 53 and linear motor 45 or sensor 52 are fed through cables 54. The detected signals from the sensor 52 is applied through the connector 53 to the controller in which control signals may be obtained the control signals by computation of the detected signals.

The control signals are fed from the connector 53 to the linear motor 45 through the cable 54. The linear encoder 50 is fed with electric power through the connector 53 and cables 54.

The operation of the embodiment described above is as follows.

Referring now to FIG. 1, with energizing of the linear motor 45, the horizontal table 4 together with the inclined base 5 makes the horizontal movement, for instance, towards left-hand side, through the horizontal guide unit 3 of the track rail 10 and sliding element 11. Thus, the working table 8 starts to upwardly move along the inclined plane 5a in virtue of the inclined guide unit 6 that comprises the track rail 12 and sliding element 13, both of which are interposed between the inclined plane 5a of the inclined base 5 and the tapered plane 7a of the sliding element 13.

The sliding element 13 is subjected to the force F acting in perpendicular to the track rail 12 from the track rail 12 riding on the inclined plane 5a. Therefore, the working table 8 moves upwardly in virtue of the vertical component F1 of the force F. It is noted that the vertical component F1 certainly acts to the central region of the working table 8. The vertical movement of the working table 8 is strictly controlled by means of the vertical guide unit 16.

The linear encoder 50 detects both of the moving direction and the position of the working table 8. The detected signals are fed from the connector 53 to the external controller, not shown, through the cables 54. The control signals based on the detected signals may control the linear motor 45 to thereby control the moving direction and vertical position of the working table 8.

The horizontal component F2 acting on the working table 8 is substantially born by the cylindrical member 14. Since the working table 8 is under the influence of the horizontal component F2 of the force F, besides the vertical component F1, the table 8 may be forced to move horizontally unless there is any resistance against the horizontal component F2. It will be seen that the horizontal component F2 is finally supported through the cylindrical member 14 by the vertical guide unit 16 which is provided between the working table 8 and the cylindrical member 14. As shown in the drawings, the cylindrical member 14 is secured at its end to the bed 2 and extends vertically so as to support the working table in a center coincided relation with each other.

The working table 8 is further guided for vertical movement by means of the vertical guide unit 16 comprising the coupling of the track rail 17 and sliding element 18, both of which are disposed between the cylindrical member 14 and the bracket 15 attached at its one end to the working table 8. The vertical guide unit 16, to which the linear motion rolling guide unit 20 as shown in FIG. 5, may be applicable has the advantages that there is no gap and rattle between the sliding element 21 and track rail 22 so that the sliding element 21 may be moved smoothly along the rail 22 and the forces applied from every angle may be squarely supported.

As regards the horizontal and vertical guide units 3 and 16, their track rails 10 and 17 are each mounted to the stationary members, that is, any one of the bed 2 and cylindrical member 14, whereas the sliding elements 11 and 18 are each disposed to the movable members, that is, any one of the horizontal table 4 and the bracket 15 of the working table 8. The sliding elements 11 and 18 are reduced in their length along the directions of them so that the apparatus may be made compact in whole size. In the inclined guide unit 6, the track rail 12 is mounted on the inclined base 5 of the movable horizontal table 4 and the sliding element 13 is secured to the working table 8. It will be thus understood that the vertical movement of the working table 8 may be controlled with stability, since the working table is subjected at the center thereof to the vertical force through the sliding element 13 irrespective of the position of the horizontal table.

The linear motor employed for the apparatus of the present invention is not to be limited to the inductor type described above and any one of the induction type and multiple-pole synchronous type may be used as far as the required accuracy may be satisfied. The cylindrical member 14 may be of a quadratic prism type or a post type other than the cylindrical type shown in the embodiment. Further, Instead of the horizontal table 4, a table may be used that is movable in an inclined attitude with respect to the bed 2, as far as the space will be allowed. Preferred in the embodiment described in detail above Brackets 15 of U-shape in cross section, each of which supports any one of the vertical guide units 16. Alternatively, the bracket may be formed of a cylindrical member just like the cylindrical member 14, around which the vertical guide units 16 are commonly arranged in a spaced relation with each other.

Although the invention has been described in its preferred form with a certain degree of particularity, it is understood that the present disclosure of the preferred form has been changed in details of construction and the combination and arrangement of parts may be resorted to without departing from the spirit and the scope of the invention as hereinafter claimed.

What is claimed is:

1. An apparatus for positioning a table on which a work piece is mounted, comprising;
    a bed including mounted thereon first track rails;
    a moving body including on a bottom surface thereof first sliding elements movable along the first track rails, the moving body further including an inclined plane of an inclination along the slide moving direction of the moving body:
    a second track rail mounted on the inclined plane with the inclination along the slide moving direction of the moving body;
    a working table including on a bottom surface thereof a second sliding element movable along the second track rail;
    a supporting member mounted to the upper surface of the bed and extending vertically;
    third track rails mounted to the supporting member so as to extend in a vertical direction;
    third sliding elements secured to the working table and movable along the third track rail; and
    driving means for travelling the moving body with relative to and along the first track rails;
    in which the supporting member comprises a cylindrical member secured to the bed.

2. An apparatus according to claim 1, in which the third track rails are mounted on the inner surface of the cylindrical member in a spaced relation with each other, and the third sliding elements are secured to the working table at such locations as to oppose to the third track rails.

3. An apparatus according to claim 2, in which the third track rails are mounted on the inner surface of the cylindrical member at three locations spaced from each other, one of the third track rails being arranged on an extension line of the inclined plane.

4. An apparatus according to claim 1, in which the driving means having comprised of a linear motor.

5. An apparatus according to claim 4, in which the linear motor has an armature secured to the bottom surface of the moving body and having exciting coils thereon, and a stator secured to the upper surface of the bed and disposed in opposition to the armature.

6. An apparatus according to claim 1, in which the first, second and third track tails are each provided on its lengthwise side surfaces with first raceway grooves.

7. An apparatus according to claim 6, in which the first, second and third sliding elements each comprises a casing having second raceway grooves correspondent with the first raceway grooves, rolling elements movable in spaces defined by the first and second raceway grooves, end caps attached to the opposed ends of the casing, and end seals secured onto the end caps.

8. An apparatus according to claim 1, in which the bed is secured to a stationary platform.

9. An apparatus according to claim 1, in which the bed is secured to a movable platform of a X-Y coordinate table.

* * * * *